(12) United States Patent
Wang et al.

(10) Patent No.: US 12,396,062 B2
(45) Date of Patent: Aug. 19, 2025

(54) PACKET ROUTING FOR LAYER-2-BASED SIDELINK RELAY

(71) Applicant: MediaTek Singapore Pte. Ltd., Singapore (SG)

(72) Inventors: Xuelong Wang, Beijing (CN); Nathan Edward Tenny, San Jose, CA (US); Ming-Yuan Cheng, Hsin-Chu (TW); Guan-Yu Lin, Hsin-Chu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 460 days.

(21) Appl. No.: 16/951,061

(22) Filed: Nov. 18, 2020

(65) Prior Publication Data

US 2021/0160956 A1 May 27, 2021

Related U.S. Application Data

(63) Continuation of application No. PCT/CN2019/120250, filed on Nov. 22, 2019.

(51) Int. Cl.
*H04W 80/02* (2009.01)
*H04W 24/10* (2009.01)
(Continued)

(52) U.S. Cl.
CPC ........... *H04W 80/02* (2013.01); *H04W 24/10* (2013.01); *H04W 40/34* (2013.01); *H04W 76/27* (2018.02);
(Continued)

(58) Field of Classification Search
CPC ..... H04W 80/02; H04W 24/10; H04W 40/34; H04W 76/27; H04W 76/30; H04W 88/04;
(Continued)

(56) References Cited

U.S. PATENT DOCUMENTS

2017/0093541 A1* 3/2017 Pan ..................... H04W 72/23
2017/0317740 A1* 11/2017 Basu Mallick ....... H04W 88/04
(Continued)

FOREIGN PATENT DOCUMENTS

CN         106211026 A      12/2014
EP           3500046 A1 *    6/2019  ............ H04W 40/22
(Continued)

OTHER PUBLICATIONS

Wang et al. Communication method and device for direct device communication system, and communication system (machine translation of WO 2018/028694 A1 from EPO website), Aug. 11, 2017, whole document (Year: 2017).*

(Continued)

*Primary Examiner* — Michael Thier
*Assistant Examiner* — Jose L Perez
(74) *Attorney, Agent, or Firm* — Helen Mao; Imperium Patent Works

(57) ABSTRACT

Apparatus and methods are provided for L2-based sidelink relay for packet routing. In novel aspect, the L2-based sidelink relay for packet routing is configured based on interest indications from one or more candidate UEs and corresponding UE report from candidate UEs. In one embodiment, the UE report is received from an Uu interface RRC message or an RRC message forwarded through an Xn interface from a serving gNB. The L2 relay configuration includes one or more elements comprising an adaptation layer address of nodes in the relay path, and a packet routing table. The adaption layer is between an RRC layer and a PDCP layer. The packet routing table includes one or more elements including adaptation layer addresses, a relay path ID, and a next hop address. In one embodiment, the relay path includes one or more relay hops.

20 Claims, 9 Drawing Sheets

(51) Int. Cl.
*H04W 40/34* (2009.01)
*H04W 76/27* (2018.01)
*H04W 76/30* (2018.01)
*H04W 88/04* (2009.01)
*H04W 92/18* (2009.01)

(52) U.S. Cl.
CPC .......... *H04W 76/30* (2018.02); *H04W 88/04* (2013.01); *H04W 92/18* (2013.01)

(58) Field of Classification Search
CPC ..... H04W 92/18; H04W 76/23; H04W 76/14; H04W 40/22; H04W 40/246; H04W 76/34
See application file for complete search history.

(56) References Cited

U.S. PATENT DOCUMENTS

| | | | |
|---|---|---|---|
| 2018/0070400 A1* | 3/2018 | Wu | H04W 4/06 |
| 2018/0084480 A1* | 3/2018 | Yasukawa | H04W 88/04 |
| 2018/0213577 A1* | 7/2018 | Burbidge | H04W 76/10 |
| 2018/0234524 A1* | 8/2018 | Cheng | H04W 76/15 |
| 2019/0159277 A1* | 5/2019 | Zhu | H04L 45/16 |
| 2019/0166486 A1* | 5/2019 | Tang | H04W 8/24 |
| 2019/0261450 A1* | 8/2019 | Adachi | H04W 76/11 |
| 2019/0281582 A1* | 9/2019 | Chen | H04W 76/14 |
| 2019/0289492 A1* | 9/2019 | Hampel | H04W 76/11 |
| 2020/0022194 A1* | 1/2020 | Wang | H04W 76/12 |
| 2020/0036484 A1* | 1/2020 | Kim | H04L 1/16 |
| 2020/0037218 A1* | 1/2020 | Karampatsis | H04W 36/16 |
| 2020/0163005 A1* | 5/2020 | Rao | H04W 8/24 |
| 2020/0187152 A1* | 6/2020 | Karampatsis | H04W 4/06 |
| 2020/0287615 A1* | 9/2020 | Zhu | H04W 40/22 |
| 2020/0351854 A1* | 11/2020 | Wang | H04W 72/20 |
| 2021/0014768 A1* | 1/2021 | Hong | H04W 40/22 |
| 2021/0051512 A1* | 2/2021 | Hampel | H04W 40/22 |
| 2021/0084547 A1* | 3/2021 | Cheng | H04W 36/00835 |
| 2021/0127430 A1* | 4/2021 | Teyeb | H04L 67/141 |
| 2021/0153063 A1* | 5/2021 | Zhang | H04W 76/14 |
| 2021/0195674 A1* | 6/2021 | Park | H04B 7/15542 |
| 2021/0368417 A1* | 11/2021 | Luo | H04W 40/22 |
| 2022/0159508 A1* | 5/2022 | Miao | H04L 69/04 |
| 2022/0191733 A1* | 6/2022 | Ali | H04L 43/16 |
| 2022/0279607 A1* | 9/2022 | Burbidge | H04W 76/10 |
| 2022/0369164 A1* | 11/2022 | Hu | H04W 88/04 |
| 2022/0377524 A1* | 11/2022 | Ferdi | H04W 8/005 |

FOREIGN PATENT DOCUMENTS

| | | | | |
|---|---|---|---|---|
| EP | 3618391 A1 | * | 3/2020 | ............. H04L 29/06 |
| WO | WO-2017024909 A1 | * | 2/2017 | ............. H04W 8/26 |
| WO | WO-2018028504 A1 | * | 2/2018 | ............ H04W 40/22 |
| WO | WO-2018028694 A1 | * | 2/2018 | ............ H04W 40/20 |
| WO | WO-2018031343 A1 | * | 2/2018 | |
| WO | WO-2020085969 A1 | * | 4/2020 | |

OTHER PUBLICATIONS

U.S. Appl. No. 16/951,648_ref (PTO-892, Notice of References Cited of U.S. Appl. No. 16/951,648), filed Oct. 27, 2021, whole document (Year: 2021).*

WIPO, written opinion for PCT/CN2019/120250, WIPO, May 17, 2022, p. 4 (Year: 2022).*

Zhang et al., Methods, apparatus, and systems for UE cooperation with UE relaying (U.S. Appl. No. 62/937,540, filed Nov. 19, 2019, whole document (Year: 2019).*

Ferdi et al., Methods and Apparatus for Direct Discovery and Communication Using a WTRU to WTRU Relay U.S. Appl. No. 62/935,971, filed Nov. 15, 2019, USPTO, whole document (Year: 2019).*

Huang et al., EPO translation of WO 2018/028504 A1, Feb. 15, 2018, EPO, whole document (Year: 2018).*

Zhang, EPO translation of WO 2017/024909 A1, Feb. 16, 2017, EPO, whole document (Year: 2017).*

ZTE, Discussion on layer 2 ProSe UE-to-network relay for feD2D (R2-168147), Nov. 14, 2016, 3GPP TSG-RAN WG2 Meeting #96, whole document (Year: 2016).*

Wayback machine, Wikipedia entry for "Routing table", Aug. 6, 2019, (web.archive.org/web/20190806091855/https://en.wikipedia.org/wiki/Routing_table) whole document (Year: 2019).*

China Intellectual Property Office Action 202011255294.4, dated Oct. 17, 2023 (8 pages).

* cited by examiner ized upper layers of the NR radio interface stacks in
PACKET ROUTING FOR LAYER-2-BASED SIDELINK RELAY

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2019/120250, titled "Methods and Apparatus of Packet Routing for Sidelink Relay," with an international filing date of Nov. 22, 2019. This application claims priority under 35 U.S.C. § 119 from Chinese Application Number CN 202011255294.4 titled "PACKET ROUTING FOR LAYER-2-BASED SIDELINK RELAY" filed on Nov. 11, 2020. The disclosure of each of the foregoing documents is incorporated herein by reference.

TECHNICAL FIELD

The disclosed embodiments relate generally to wireless communication, and, more particularly, to packet routing for layer-2-based sidelink relay.

BACKGROUND 5G radio access technology will be a key component of the modern access network. It will address high traffic growth and increasing demand for high-bandwidth connectivity. Wireless relay in cellular networks provides extended coverage and improved transmission reliability. Long term evolution (LTE) network introduced 3GPP sidelink, the direct communication between two user equipment (UEs) without signal relay through a base station. In 3GPP New Radio (NR), sidelink continues evolving. With new functionalities supported, the sidelink offers low latency, high reliability and high throughput for device to device communications. Using sidelink for wireless relay provides a reliable and efficient way for traffic forwarding. For the early sidelink-based wireless relay services, such as the ProSe UE-to-Network relay, the traffic between the remote UE and the base station is forwarded at the IP layer by the relay UE. The relay operation was specified for LTE aiming at coverage expansion from the perspective of Layer-3 (L3) relay. The Layer-2 (L2) based relay using sidelink can improve the efficiency and flexibility.

Improvements and enhancements are required for packet routing using sidelink in the wireless network.

SUMMARY

Apparatus and methods are provided for L2-based sidelink relay for packet routing. In novel aspect, the L2-based sidelink relay for packet routing is configured based on indications from one or more candidate UEs and corresponding UE report from candidate UEs. In one embodiment, the relay UE obtains relay configuration, configures an L2 packet routing to a remote UE for L2-based packet relay using a first sidelink of the relay UE based on the L2 relay configuration, wherein an L2 relay path is established for the remote UE using the first sidelink, performs packet data relay to and from the remote UE based on the configured L2 packet routing and releases the configured L2 packet routing upon detecting one or more releasing triggering events. In one embodiment, the L2 relay configuration is generated by a first base station in the wireless network, and wherein the L2 relay configuration is based on UE information reports from a plurality of UE candidates for establishing the L2 relay path. In another embodiment, the L2 relay configuration is generated by a first base station in the wireless network, and wherein the L2 relay configuration is based on UE information reports from a plurality of UE candidates for establishing the L2 relay path. In one embodiment, the first base station receives an UE information report of a candidate UE by one receiving route comprising an Uu interface RRC message from the candidate UE and an RRC message forwarded to the first base station through an Xn interface from a second base station. In yet another embodiment, the relay UE obtains the L2 relay configuration by one receiving route comprising from the first base station, from an Uu interface RRC message and from a second base station, an RRC message forwarded from the first base station through an Xn interface to the second base station. In one embodiment, the L2 relay configuration includes one or more elements comprising an adaptation layer address of nodes in the relay path, and a packet routing table, wherein the adaption layer is between an RLC layer and a PDCP layer. In another embodiment, the packet routing table includes one or more routing elements comprising one or more adaptation layer addresses, a relay path identification (ID), and a next hop address. In yet another embodiment, the relay path includes one or more relay hops. In one embodiment, the relay UE receives an updated L2 relay configuration, wherein the updated L2 relay configuration is triggered by one or more updated UE information reports from one or more candidate UEs and updates the L2 packet routing to the remote UE based on the updated L2 relay configuration.

In one embodiment, a UE obtains an L2 relay configuration in a wireless network, configures an L2 packet routing for L2-based packet relay using a sidelink between the UE and a first relay UE based on the L2 relay configuration, wherein an L2 relay path is established for the UE using the sidelink, performs packet data transmission and reception to and from an end-node based on the configured L2 packet routing, and releases the configured L2 packet routing upon detecting one or more releasing triggering events.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
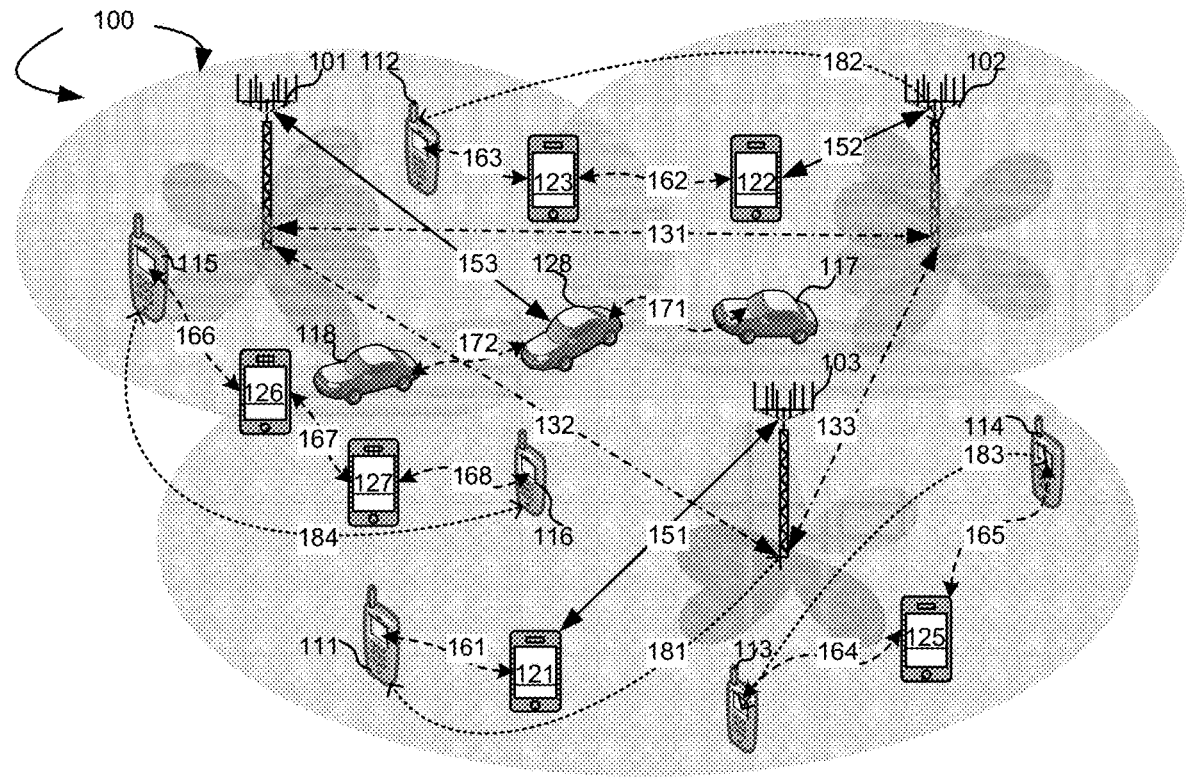
FIG. 1 is a schematic system diagram illustrating an exemplary wireless network for layer-2 (L2)-based sidelink relay in accordance with embodiments of the current invention.
Figure 1:
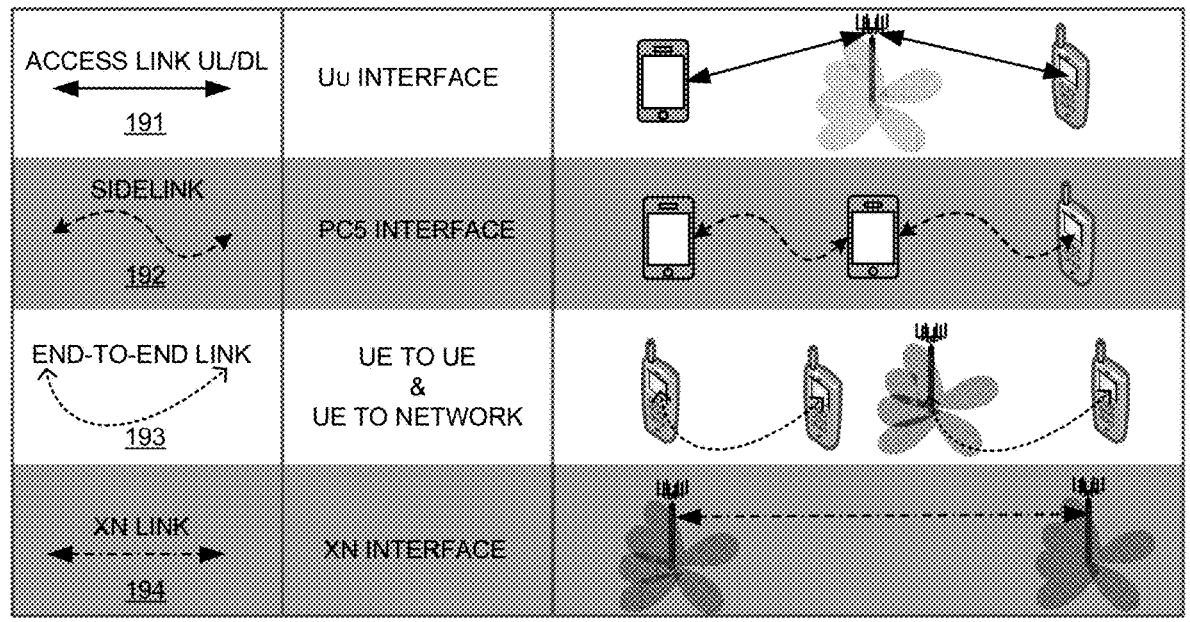

FIG. 1 is a schematic system diagram illustrating an exemplary wireless network for layer-2 (L2)-based sidelink relay in accordance with embodiments of the current invention. Wireless system 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. The network can be homogeneous network or heterogeneous network, which can be deployed with the same frequency or different frequency. gNB 101, gNB 102 and gNB 103 are base stations in the NR network, the serving area of which may or may not overlap with each other. Backhaul connections such as 131, 132, and 133, connect the non-co-located receiving base units, such as gNB 101, 102 and 103. These backhaul connections can be either ideal or non-ideal. gNB 101 is connected with gNB 102 via Xnr interface 131 and is connected with gNB 103 via Xnr interface 132. gNB 102 is connected with gNB 103 via Xnr interface 133.

Wireless network 100 also includes multiple communication devices or mobile stations, such user equipments (UEs) such as UEs 111, 112, 113, 114, 115 and 116, 121, 122, 123, 124, 125, 126, and 127. Communication devices or mobile stations in wireless network 100 may also refers to devices with wireless connectivity in a vehicle, such as mobile devices 118, 117 and 128. The exemplary mobile devices in wireless network 100 have sidelink capabilities. The mobile devices can establish one or more connections with one or more base stations, such as gNB 101, 102, and 103. The mobile device may also be out of connection with the base stations with its access links but can transmit and receive data packets with another one or more other mobile stations or with one or more base stations through L2-based sidelink relay.

In one novel aspect, L2-based sidelink relay for packet routing is configured. In a first embodiment, the L2-based UE-to-Network one-hop relay using sidelink is configured. A remote UE 111 and gNB 103 forms an end-to-end path 181 through a L2-based sidelink relay with a relay UE 121. End-to-end path 181 includes an access link 151 between gNB 103 and relay UE 121 and a sidelink 161 between remote UE 111 and relay UE 121. In a second embodiment, the L2-based UE-to-Network multi-hop relay using sidelink is configured. A remote UE 112 and gNB 102 forms an end-to-end path 182 through a L2-based sidelink relay with a relay UE 122 and another relay UE 123. End-to-end path 182 includes an access link 152 between gNB 102 and relay UE 122, sidelink 162 between relay UE 122 and relay UE 123, and sidelink 163 between remote UE 112 and relay UE 123. In a third embodiment, the L2-based UE-to-UE one-hop relay using sidelink is configured. An end node UE 113 and another end node UE 114 forms an end-to-end path 183 through a L2-based sidelink relay with a relay UE 125. End-to-end path 183 includes a sidelink 164 between end node UE 113 and relay UE 125 and a sidelink 165 between end node UE 114 and relay UE 125. In a fourth embodiment, the L2-based UE-to-UE multi-hop relay using sidelink is configured. An end node UE 115 and another end node UE 116 forms an end-to-end path 184 through a L2-based sidelink relay with a relay UE 126 and another relay UE 127. End-to-end path 184 includes a sidelink 166 between end node UE 115 and relay UE 126, a sidelink 167 between relay UE 126 and relay UE 127, and a sidelink 168 between end node UE 116 and relay UE 127. In another embodiment, a relay mobile device is configured with multiple remote mobile devices or multiple end node mobile devices. A relay UE 128, with an access link 153 to gNB 101 is configured with two remote UEs 117 and 118 through sidelink 171 and 172, respectively. In other embodiments, a relay mobile device can be configured for multiple UE-to-UE relay paths.

FIG. 1 illustrates different links and their interfaces for L2-based sidelink relay. An access link 191 is a link between a base station, such as gNB and a mobile device, such as a UE. The UE can be a remote UE or a relay UE. The access link includes both the uplink (UL) and the downlink (DL) between the base station and the mobile device. The interface for the access link is an NR Uu interface. In one embodiment, the remote UE also establishes access link with a base station. A sidelink 192 is a link between two mobile devices and uses PC5 interface. The sidelink can be a link between a remote UE/end-node UE and a relay UE or a link between two relay mobile devices/UEs for the multi-hop relay. The end-to-end link 193 for a relay path can be a link between two end-node mobile devices for a UE-to-UE relay or a base station to mobile device for a UE-to-Network relay. An Xn link 194 is the backhaul link between two base stations, such as gNBs using the Xn interface. In one embodiment, candidate relay UE information is transmitted to the base station via the Xn link.

Figure 2:
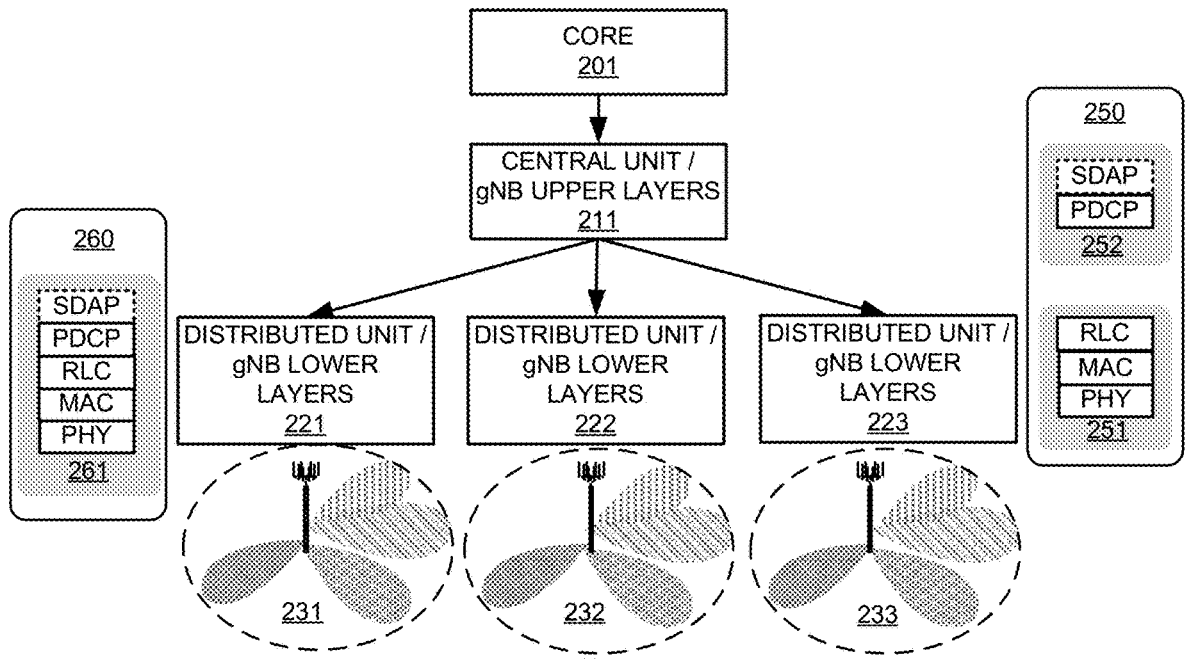
FIG. 2 illustrates an exemplary NR wireless system with centralized upper layers of the NR radio interface stacks in accordance with embodiments of the current invention.

FIG. 2 illustrates an exemplary NR wireless system with centralized upper layers of the NR radio interface stacks in accordance with embodiments of the current invention. Different protocol split options between central unit and lower layers of gNB nodes may be possible. The functional split between the central unit and lower layers of gNB nodes may depend on the transport layer. Low performance transport between the Central Unit and lower layers of gNB nodes can enable the higher protocol layers of the NR radio stacks to be supported in the Central Unit, since the higher protocol layers have lower performance requirements on the transport layer in terms of bandwidth, delay, synchronization and jitter. In one embodiment, SDAP and PDCP layer are located in the central unit, while RLC, MAC and PHY layers are located in the distributed unit. A Core unit 201 is connected with one central unit 211 with gNB upper layer 252. In one embodiment 250, gNB upper layer 252 includes the PDCP layer and optionally the SDAP layer. Central unit 211 is connected with distributed units 221, 222, and 223. Distributed units 221, 222, and 223 each corresponds to a cell 231, 232, and 233, respectively. The distributed units, such as 221, 222 and 223 includes gNB lower layers 251. In one embodiment, gNB lower layers 251 include the PHY, MAC and the RLC layers. In another embodiment 260, each gNB has the protocol stacks 261 including SDAP, PDCP, RLC, MAC and PHY layers.

Figure 3:
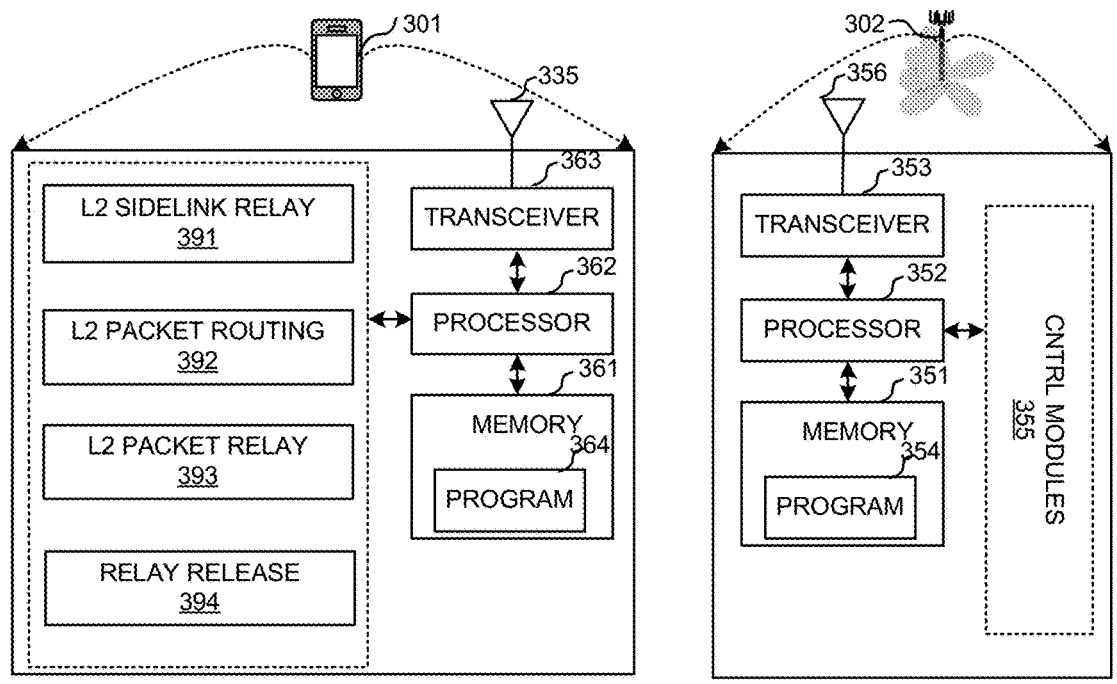
FIG. 3 illustrates simplified block diagrams of a base station and a mobile device/UE for L2-based sidelink relay in accordance with embodiments of the current invention.

FIG. 3 illustrates simplified block diagrams of a base station and a mobile device/UE for L2-based sidelink relay in accordance with embodiments of the current invention. gNB 302 has an antenna 356, which transmits and receives radio signals. An RF transceiver circuit 353, coupled with the antenna, receives RF signals from antenna 356, converts them to baseband signals, and sends them to processor 352. RF transceiver 353 also converts received baseband signals from processor 352, converts them to RF signals, and sends out to antenna 356. Processor 352 processes the received baseband signals and invokes different functional modules to perform features in gNB 302. Memory 351 stores program instructions and data 354 to control the operations of gNB 302. gNB 302 also includes a set of control modules 355 that carry out functional tasks to communicate with mobile stations.

UE 301 has an antenna 335, which transmits and receives radio signals. An RF transceiver circuit 363, coupled with the antenna, receives RF signals from antenna 335, converts them to baseband signals, and sends them to processor 362. In one embodiment, the RF transceiver may comprise two RF modules (not shown). A first RF module is used for HF transmitting and receiving, and the other RF module is used for different frequency bands transmitting and receiving which is different from the HF transceiver. RF transceiver 363 also converts received baseband signals from processor 362, converts them to RF signals, and sends out to antenna 335. Processor 362 processes the received baseband signals and invokes different functional modules to perform features in UE 301. Memory 361 stores program instructions and data 364 to control the operations of UE 301. Antenna 335 sends uplink transmission and receives downlink transmissions to/from antenna 356 of gNB 302.

Mobile station 301 also includes a set of control modules that carry out functional tasks. These control modules can be implemented by circuits, software, firmware, or a combination of them. An L2 sidelink relay circuit 391 obtains an L2 relay configuration. An L2 packet routing circuit 392 configures an L2 packet routing to a remote UE for L2-based packet relay using a first sidelink of the UE based on the L2 relay configuration, wherein an L2 relay path is established for the remote UE using the first sidelink. An L2 packet relay circuit 393 performs packet data relay to and from the remote UE based on the configured L2 packet routing. A relay release circuit 394 releases the configured L2 packet routing upon detecting one or more releasing triggering events.

Figure 4:
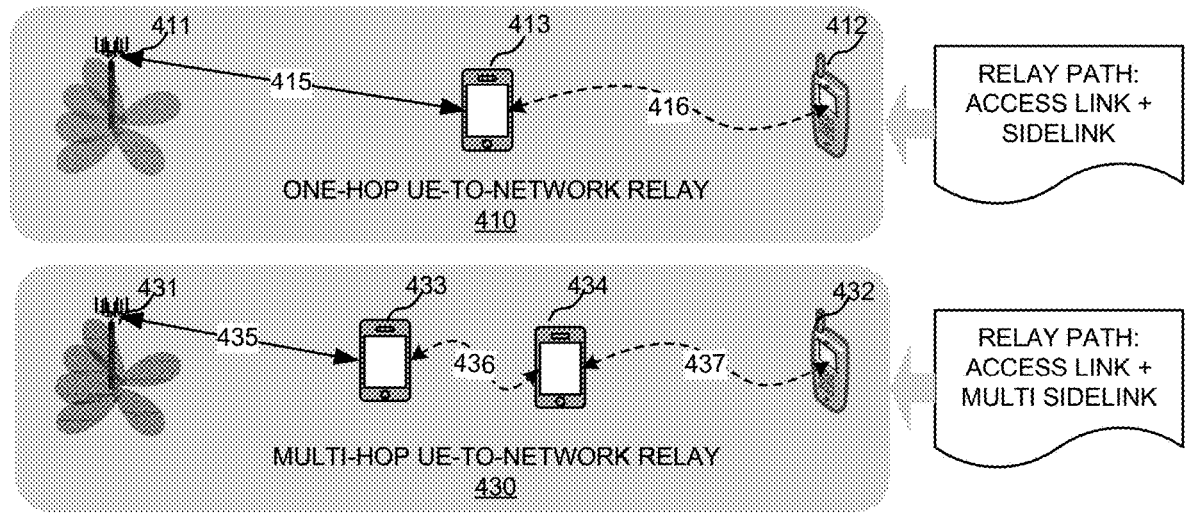
FIG. 4 illustrates exemplary diagrams for a L2-based UE-to-Network relay using sidelink in accordance with embodiments of the current invention.

FIG. 4 illustrates exemplary diagrams for a L2-based UE-to-Network relay using sidelink in accordance with embodiments of the current invention. In one embodiment, the UE-to-Network relay with sidelink is a one-hop relay 410. A remote UE 412 established a relay path with a gNB 411 through a relay UE 413. Relay UE 413 communicates with gNB 411 via access link 415. Relay UE 413 communicates with remote UE 412 through sidelink 416. gNB 411 transmits data packets destined to remote UE 412 through DL to relay UE 413 and receives data packets from remote UE 412 through UL from relay UE 413. The relay path between remote UE 412 and gNB 411 includes access link 415 and sidelink 416. In another embodiment, a multi-hop UE-to-Network relay 430 is configured. A remote UE 432 established a relay path with a gNB 431 through relay UEs 433 and 434. Relay UE 433 communicates with gNB 431 via access link 435. Relay UE 433 communicates with relay UE 434 through sidelink 436. Relay UE 434 communicates with remote UE 432 through sidelink 437. gNB 431 transmits data packets destined to remote UE 432 through DL to relay UE 433, which is forwarded to relay UE 434 through sidelink 436. gNB 431 receives data packets from remote UE 432 through UL from relay UE 433, which is forwarded from relay UE 434 through sidelink 436. The relay path between remote UE 432 and gNB 431 includes access link 435 and sidelinks 436 and 437. Multi-hop UE-to-Network relay can be configured with two or more relay UEs. In one embodiment, the one or more relay UEs are connected with the network end-node, such as gNB 411 and 431. In another embodiment, multiple relay UEs may be connected with different gNBs. For example, relay UE 433 is connected with network end-node gNB 431, while relay UE 434 is connected with a different gNB. gNB 431 gets UE information of relay UE 434 from its serving gNB through backhaul connections, such as the Xnr interface. In one embodiment, the remote UE, such as remote UE 412 and remote UE 432, is connected with the network end-node, such as gNB 411 and gNB 431, respectively. In another embodiment, the remote UE is connected with a different gNB. In yet another embodiment, the remote UE has no direct network connection. In both the one-hop relay and the multi-hop relay, the packet routing occurs at the base station, the one or more relay UEs and the remote UE.

Figure 5:
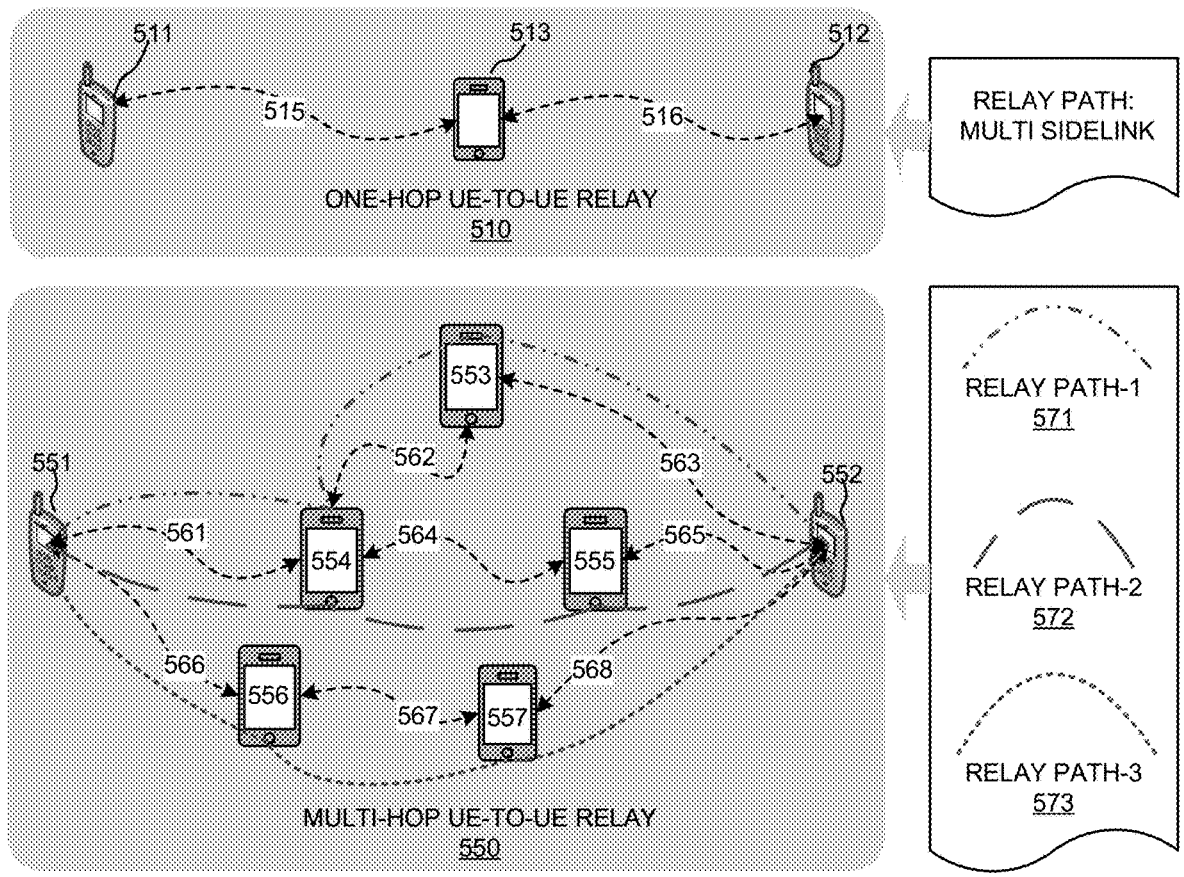
FIG. 5 illustrates exemplary diagrams for a L2-based UE-to-UE relay using sidelink in accordance with embodiments of the current invention.

FIG. 5 illustrates exemplary diagrams for a L2-based UE-to-UE relay using sidelink in accordance with embodiments of the current invention. In one embodiment, the UE-to-UE relay with sidelink is a one-hop relay 510. An end-node UE 512 established a data path with another end-node UE 511 through a relay UE 513. Relay UE 513 communicates with end-node UE 511 via sidelink 515. Relay UE 513 communicates with end-node UE 512 through sidelink 516. End-node UE 511 transmits data packets destined to end-node UE 512 through sidelink 515 to relay UE 513 and receives data packets from end-node UE 512 through sidelink 516 from relay UE 513. The relay path between end-node UE 512 and end-node UE 511 includes two sidelinks 515 and 516.

In another embodiment, a multi-hop UE-to-UE relay 550 is configured. Two end-node UEs 551 and 552 is configured with multi-hop UE-to-UE relay communication through sidelinks. In one embodiment, multiple relay paths are configured for UE-to-UE relay between end-node UE 551 and end-node UE 552. In one embodiment, multiple relay UE candidates are identified, including UE 553, 554, 555, 556, and 557. Based on the measurement reports from the candidate UEs, one or more relay paths are configured for end-node UEs 551 and 552 for L2-based UE-to-UE relay. In an exemplary scenario, end-node UE 551 has sidelink 561 and 566 with relay UE 554 and 556, respectively. Relay UE 554 has sidelinks 562 and 564 with relay UE 553 and 555, respectively. Relay UE 556 has one sidelink 567 with relay UE 557. Relay UEs 553, 555, and 557 have sidelinks 563, 565 and 568 with end-node UE 552, respectively. Three exemplary relay paths are configured for UE-to-UE L2-based sidelink relay between end-node UE 551 and 552. Relay path-1 571 includes sidelink 561 between end-node UE 551 and relay UE 554, sidelink 562 between relay UE 554 and relay UE 553, and sidelink 563 between relay UE 553 and end-node UE 552. Relay path-2 572 includes sidelink 561 between end-node UE 551 and relay UE 554, sidelink 564 between relay UE 554 and relay UE 555, and sidelink 565 between relay UE 555 and end-node UE 552. Relay path-3 573 includes sidelink 566 between end-node UE 551 and relay UE 556, sidelink 567 between relay UE 556 and relay UE 557, and sidelink 568 between relay UE 557 and end-node UE 552. One relay path is selected to perform data communications between the end-node UEs. In one embodiment, the multiple relay paths configuration may include both multi-hop relay configuration and one-hop relay configuration. The end-nodes can switch among different configured relay paths based on switching rules. An end-node in a relay configuration can be a network node, such as a gNB or a mobile station node, such as a UE. In other embodiments, the multiple relay paths configuration applies to different type of sidelink relays as described above, including the one-hop UE-to-Network relay, the multi-hop UE-to-network relay, the one-hop UE-to-UE relay, and the multi-hop UE-to-UE relay. Similar to UE-to-Network relay discussed above, multiple relay UEs are connected in the wireless network with one or more network nodes.

In one novel aspect, the wireless relay using sidelink is implemented at L2 for packet routing. In one embodiment, an adaptation layer is introduced on top of the radio link control (RLC) layer for purpose of packet routing and other functionalities, such as bearer mapping, flow control, radio link failure (RLF) indication, and other functionalities. For a relay path, there are two end-nodes communicating with each other through one or more relay nodes. For the protocol stack illustrations below, the relay nodes are mobile devices with sidelink configured. The two end-nodes can be both mobile devices, such as end-node UEs. In other embodiments, one end-node is a network node, such as a gNB in the NR network, while the other end-node is a mobile device, such as a UE.

Figure 6:
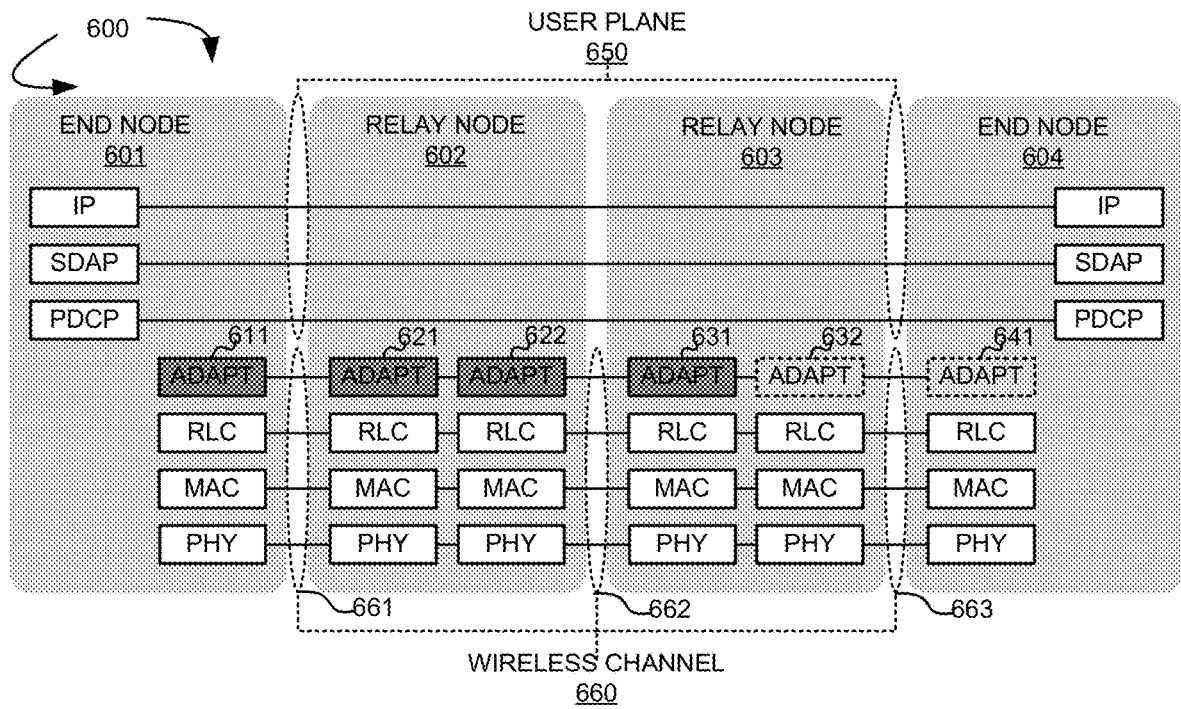
FIG. 6 illustrates exemplary diagrams of the user plane protocol stacks for packet routing of L2-based sidelink relay in accordance with embodiments of the current invention.

FIG. 6 illustrates exemplary diagrams of the user plane protocol stacks for packet routing of L2-based sidelink relay in accordance with embodiments of the current invention. An exemplary relay path stacks 600 includes two end node stacks 601 and 604, and two relay nodes stacks 602 and 603. The lower layer wireless channel 660 is established through the PHY, MAC, RLC and ADAPT layers of each node on the relay path. A first wireless connection 661 is established between lower layer protocol stack of end-node 601 and a first lower layer protocol stack of relay node 602. A second wireless link 662 is established between the second lower layer protocol stack of relay node 602 and a first lower layer protocol stack of relay node 603. A second lower layer protocol stack of relay node 603 establishes a third wireless link 663 with lower layer protocol stack of end-node 604. In one embodiment, for a UE-to-Network relay, the first wireless link 661 is an RLC wireless link via an Uu interface between relay node 602 and a network end node 601. In another embodiment, for a UE-to-UE relay, the first wireless link 661 is a sidelink via the PC5 interface between the relay node 602 and a mobile station end-node 601. On the user plane, end-to-end protocol connection 650 are established directly between the protocol stacks at the IP layer, the SDAP layer and the PDCP layer of end-node 601 and 604. The ADAPT layer of each node is used for packet routing of the L2-based sidelink relay. In one embodiment, each relay node is configured with two ADAPT layer stack. Relay node 602 has ADAPT 621 and 622. Relay node 603 has ADAPT 631 and 632. Each ADAPT stack of the one or more relay nodes is connected with an end-node ADAPT stack. ADAPT 621 of relay node 602 is connected with ADAPT 611 of end-node 601. ADAPT 632 of relay node 603 is connected with ADAPT 641 of end-node 604. In another embodiment, there is no ADAPT configured for the last hop of the UE-to-Network relay path. For the last hop of relay, which is the sidelink between the relay node and the mobile station/UE end node, there is no ADAPT layer configured for this sidelink. ADAPT 632 of relay node 603 and ADAPT 641 of end node 604 are not configured for the relay path stack 600.

Figure 7:
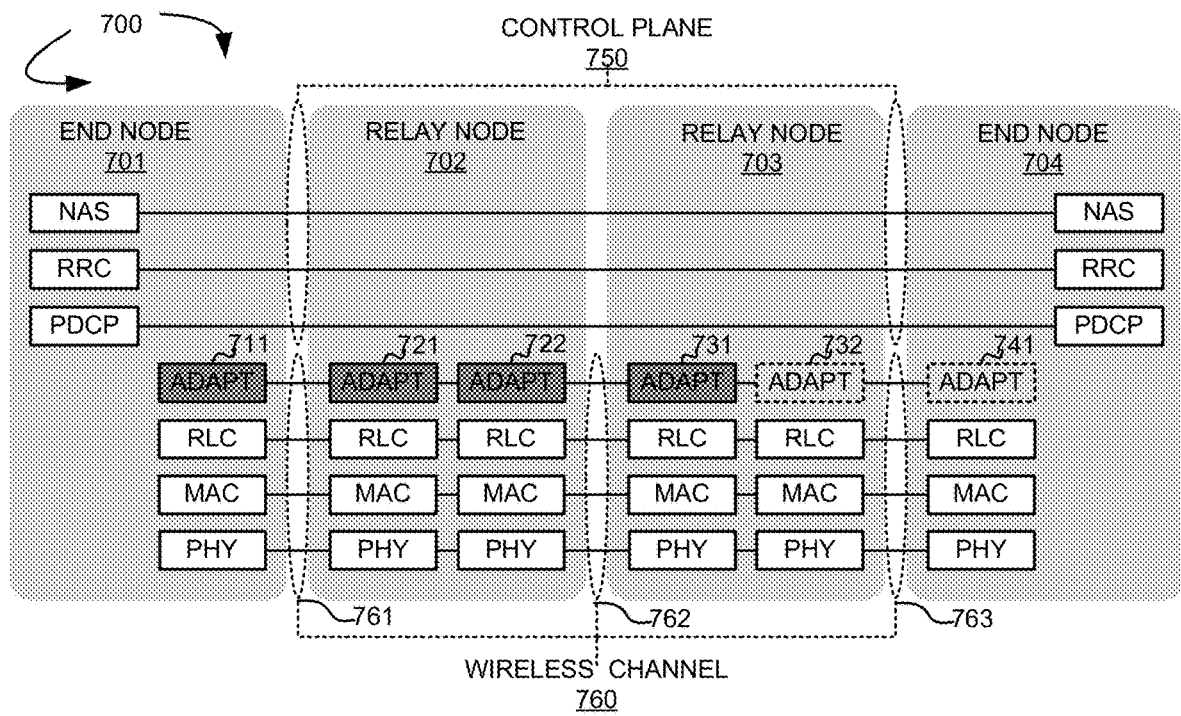
FIG. 7 illustrates exemplary diagrams of the control plane protocol stacks for packet routing of L2-based sidelink relay in accordance with embodiments of the current invention.

FIG. 7 illustrates exemplary diagrams of the control plane protocol stacks for packet routing of L2-based sidelink relay in accordance with embodiments of the current invention. An exemplary relay path stacks 700 includes two end node stacks 701 and 704, and two relay nodes stacks 702 and 703. The lower layer wireless channel 760 is established through the PHY, MAC, RLC and ADAPT layers of each node on the relay path. A first wireless connection 761 is established between lower layer protocol stack of end-node 701 and a first lower layer protocol stack of relay node 702. A second wireless link 762 is established between the second lower layer protocol stack of relay node 702 and a first lower layer protocol stack of relay node 703. A second lower layer protocol stack of relay node 703 establishes a third wireless link 763 with lower layer protocol stack of end-node 704. In one embodiment, for a UE-to-Network relay, the first wireless link 761 is an RLC wireless link via an Uu interface between relay node 702 and a network end node 701. In another embodiment, for a UE-to-UE relay, the first wireless link 761 is a sidelink via the PC5 interface between the relay node 702 and a mobile station end-node 701. On the control plane, end-to-end protocol connection 750 are established directly between the protocol stacks at the NAS layer, the RRC layer and the PDCP layer of end-node 701 and 704. The ADAPT layer of each node is used for packet routing of the L2-based sidelink relay. In one embodiment, each relay node is configured with two ADAPT layer stack. Relay node 702 has ADAPT 721 and 722. Relay node 703 has ADAPT 731 and 732. Each ADAPT stack of the one or more relay nodes is connected with an end-node ADAPT stack. ADAPT 721 of relay node 702 is connected with ADAPT 711 of end-node 701. ADAPT 732 of relay node 703 is connected with ADAPT 741 of end-node 704. In another embodiment, there is no ADAPT configured for the last hop of the UE-to-Network relay path. For the last hop of relay, which is the sidelink between the relay node and the mobile station/UE end node, there is no ADAPT layer configured for this sidelink. ADAPT 732 of relay node 703 and ADAPT 741 of end node 704 are not configured for the relay path stack 700.

Figure 8:
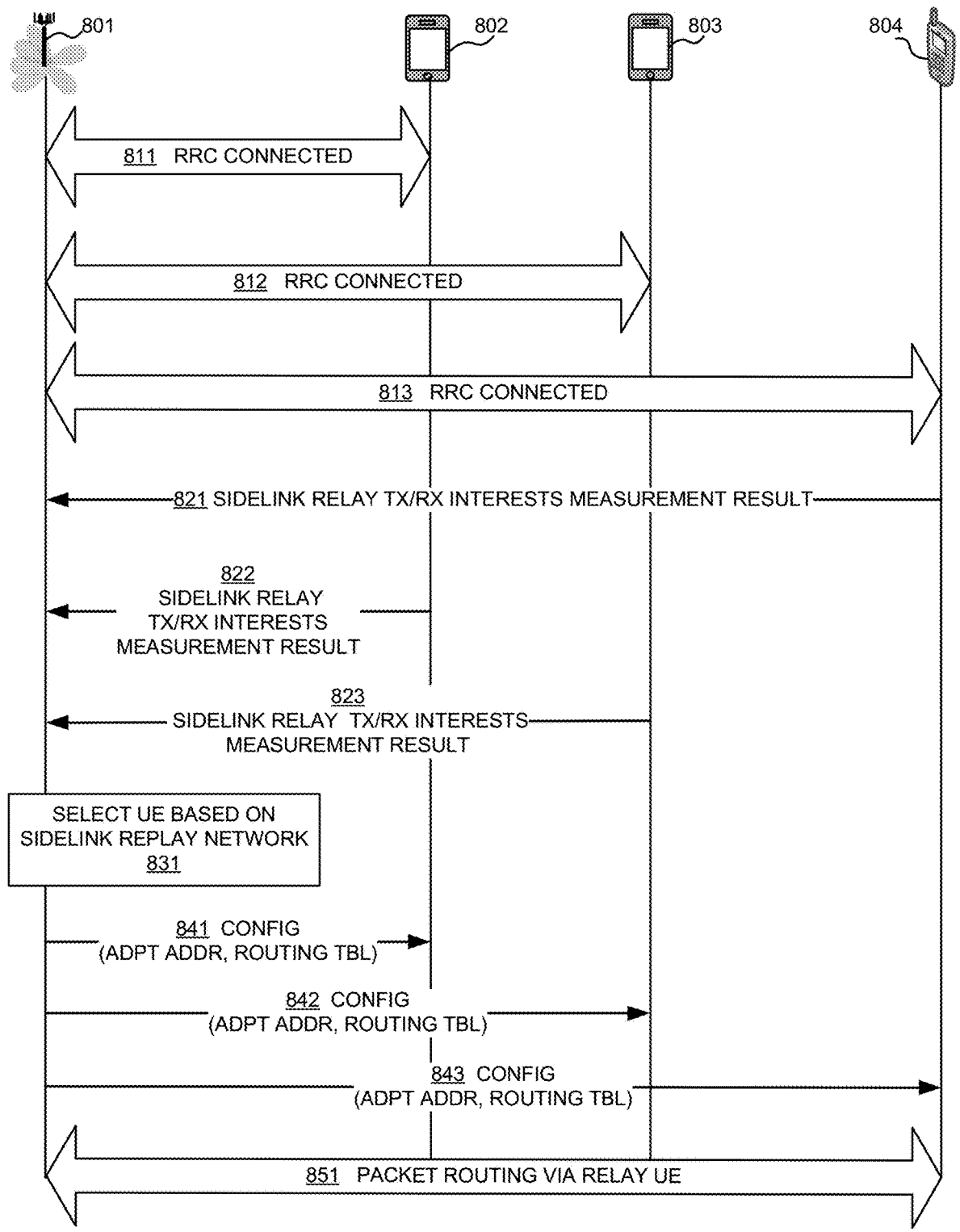
FIG. 8 illustrates exemplary flow diagrams of establishing the L2-based packet routing for sidelink relay in accordance with embodiments of the current invention.

FIG. 8 illustrates exemplary flow diagrams of establishing the L2-based packet routing for sidelink relay in accordance with embodiments of the current invention. In one novel aspect, the L2-based sidelink relay is configured by a network node, such as a base station. Sidelink communication path between the base station and the remote UE are established upon reception of the UE information message from one or more candidate relay UEs and the remote UE. Packet routing information are configured for the nodes within the L2-based sidelink relay path. Upon the relay communication path is established, the data packets are routed between the end nodes through the relay nodes. The packet routing information for the L2-based sidelink relay path is updated upon receiving UE information from one or more candidate relay UEs and the remote UE. The L2-based sidelink relay path is released upon detecting releasing triggering events. A gNB 801 is connected with a relay UE 802, a relay UE 803 and a remote UE 804. At step 811, relay UE 802 establishes RRC connection with gNB 801. At step 812, relay UE 803 establishes RRC connection with gNB

801. At step 813, remote UE 804 establishes RRC connection with gNB 801. In one embodiment, gNB 801 broadcasts an indication to express its support of UE-to-Network relay operation. In another embodiment, gNB 801 broadcasts the corresponding configuration parameters to support sidelink relay discovery and communication. In other embodiments, steps 811, 812, 813 may be performed in other sequences.

At step 821, remote UE 804 transmits a relay-interest indication, which indicate that the UE is interested in establishing an L2-based sidelink relay transmission (TX) and receiving (RX). Optionally, the UE measurement report from UE 804 is also sent to gNB 801. In one embodiment, remote UE 804 sends the relay-interest indication to the network to indicate the interest to do radio communication, including TX, RX or the combination, via L2-based sidelink relay. The relay-interest indication from the UE may also include a particular frequency or a frequency list for the sidelink relay. Optionally together with the relay TX/RX interest to the gNB, remote UE 804 also reports the UE radio signal measurement result, e.g. reference signal received power (RSRP), reference signal received quality (RSRQ), or signal to interference plus noise ratio (SINR), towards one or more peer UEs over one or more sidelinks. The UE report from remote UE 804 may also include the radio signal measurement result, e.g. RSRP, RSRQ, or SINR, towards its camped cell. In one embodiment, the UE report from remote UE 804 is carried in the SidelinkUEinformationNR or SidelinkUEinformationNR PC5 message. The measurement can be based on the preconfigured resources, the resources indicated in system information, or resources included in previously received dedicated signal message.

In one embodiment, the relay-interest indication is decoupled from the UE measurement report. Upon receiving the relay-interest indication from a UE, based on the received relay-interest indication from the UE, the gNB configures the UE to do measurement via RRC Reconfiguration message with measurement configuration. The UE measurement report includes a sidelink measurement report including radio signal measurement result, e.g. RSRP, RSRQ, or SINR, on one or more peer UEs over the sidelink. The UE measurement report further includes the radio signal measurement result, e.g. RSRP, RSRQ, or SINR, towards its camped cell if any. In one embodiment, the sidelink measurement report is reported per peer UE. In another embodiment, a specific UE ID is used to identify a particular peer UE and the sidelink measurement report has a list of measurement result each identified by the UE ID. The measurement configuration from the network configures one or more measurement objects including frequency, measurement event, etc. The sidelink oriented measurement event can refer to Event A4, which indicates a neighbor cell becomes better than a threshold defined for NR air interface. In one embodiment, the measurement event can refer to a sidelink specific measurement event: a neighbor UE becomes better than a threshold. In yet another embodiment, when the remote UE is served by a different gNB other than gNB 801, the remote UE report may be sent to a different gNB and then be forwarded via X2 or Xn interface to the destination gNB 801.

At step 822, relay UE 802 transmits a relay-interest indication and optionally the UE measurement report to gNB 801. At step 823, relay UE 803 transmits a relay-interest indication and optionally UE measurement report to gNB 801. In one embodiment, relay UE 802 and/or relay UE 803 send the relay-interest indication to the network to indicate the interest to do radio communication, including TX, RX or the combination, via L2-based sidelink relay. The relay-interest indication from the UE also includes a particular frequency or a frequency list for the sidelink relay. Optionally together with the relay TX/RX interest report to the gNB, relay UE 802 and/or 803 also reports the UE radio signal measurement result, e.g. reference signal received power (RSRP), reference signal received quality (RSRQ), or signal to interference plus noise ratio (SINR), towards one or more peer UEs over one or more sidelinks. The UE report from relay UE 802 and/or 803 may also include the radio signal measurement result, e.g. RSRP, RSRQ, or SINR, towards its camped cell. In one embodiment, the UE report from relay UE 802 and/or 803 is carried in the SidelinkUEinformationNR or SidelinkUEinformationNR PC5 message. The measurement can be based on the preconfigured resources, the resources indicated in system information, or resources included in previously received dedicated signal message. In one embodiment, the relay-interest indication from the relay UE is decoupled from the measurement result report. gNB 801, via RRC Reconfiguration message with measurement configuration, configures the one or more relay UEs to do measurement based on the relay-interest indication from the relay UE. The one or more relay UEs report radio signal measurement result, e.g. RSRP, RSRQ, or SINR, on one or more peer UEs over corresponding sidelinks and the radio signal measurement result, e.g. RSRP, RSRQ, or SINR, towards corresponding camped cell. The measurement configuration behavior described above for remote UE applies to relay UEs. When a different base station/gNB serves the relay UE, the relay UE report may be sent to the corresponding serving base station/gNB and then be forwarded via X2 or Xn interface by that serving gNB to the destination gNB 801. In other embodiments, steps 821, 822, 823 may be performed in other sequences.

At step 831, gNB 801 selects one or more relay UEs based on the information received from remote UE 804 and one or more candidate relay UEs. gNB 801 allocates an Adaptation (ADAPT) Layer Address for each node, including the remote UE and relay node UEs, and the base station/gNB 801. In one embodiment, the ADAPT layer address is allocated per the specific UE ID received by gNB 801 in the measurement report. gNB 801 labels the paths for both downstream and upstream between gNB 801 and the remote UE 804 configured with different sets of one or more relay UEs. A plural of relay paths may exist between the source node and the destination node depending on which one or more relay UEs are configured for the relay path. One relay path ID is assigned to identify one potential relay path. gNB 801 derives a particular routing table for each node of each corresponding relay path. In one embodiment, the ADAPT layer address of a UE, including a remote UE and a relay UE, is proposed by the corresponding UE via UE information report message to gNB 801. In one embodiment, gNB 801 upon obtaining the ADAPT layer address for a UE adopts the proposed ADAPT layer address for packet routing purpose. In another embodiment, gNB 801 rejects the UE proposed ADAPT layer address. In other embodiments, gNB 801 adopts a selected group of ADAPT layer addresses proposed by corresponding one or more UEs while rejecting the rest of UE proposed ADAPT layer addresses. In one embodiment, the routing table for a UE includes the ADAPT layer address of the destination and the next hop. The relay path ID is optional in the routing table. The next hop ADAPT address identifies a downstream relay UE, or the remote UE for downstream within the relay path. The next hop ADAPT address identifies an upstream relay UE or the destination gNB for upstream within the relay path. When a plural of paths is configured for a pair of end nodes, multiple next hop ADAPT addresses can be put into the routing table. In one embodiment, a relay UE may hold multiple ADAPT layer addresses when it serves multiple remote UEs with one ADAPT layer address configured for each remote UE.

gNB 801 sends relay path configuration with ADAPT addresses and routing tables to UEs 802, 803 and 804 at steps 841, 842, and 843, respectively. In other embodiments, steps 841, 842, 843 may be performed in other sequences. gNB 801 configures the ADAPT layer addresses and the calculated routing table for each UE node including both the remote UE and the one or more relay UEs. In one embodiment, the relay path is configured with direct configuration via air interface. The configured routing parameters is carried by Uu RRCReconfiguration message. In another embodiment, the relay path is configured with indirect configuration via PC5 interface. The configured routing parameters is carried by RRCReconfigurationSidelink message. In one scenario, one or more relay UEs or the remote UE is served by one or more other base stations. The configured routing parameters to the one or more relay UE and/or the remote UE out of gNB 801 coverage area are forwarded from their corresponding serving base station. When the UE, the relay UE or the remote UE, receives configured routing parameters, the UE updates the UE context to include the configured routing parameters. In one embodiment, a relay UE serves multiple remote UEs. The relay UE maintains multiple routing table with each identified by corresponding UE's ADAPT layer address and/or other unique UE IDs. At step 851, packet transmitting and receiving is performed between gNB 801 and remote UE 804 via the L2-based sidelink relay path. For each data packet or control packet transmitted between gNB 801 and remote UE 804, a routing header is put into the packet header by the source node for purpose of routing within the relay path. In one embodiment, the routing header includes the ADAPT layer address of the destination. The node receiving the packet, looks up the routing table and find the next hop address for the packet, and delivers the packet to the next hop accordingly. In one embodiment, there is no ADAPT between the last hop relay UE and the remote UE. The whole ADAPT layer header including the routing header is removed before the downstream packets is forwarded to the remote UE. For the upstream packets going to the first hop relay UE from the remote UE, a new ADAPT layer header including the routing header is added. In another embodiment, there is no intermediate relay UE. No ADAPT layer is deployed in between the relay path for the purpose of routing and packet routing functionality is disabled.

Figure 9:
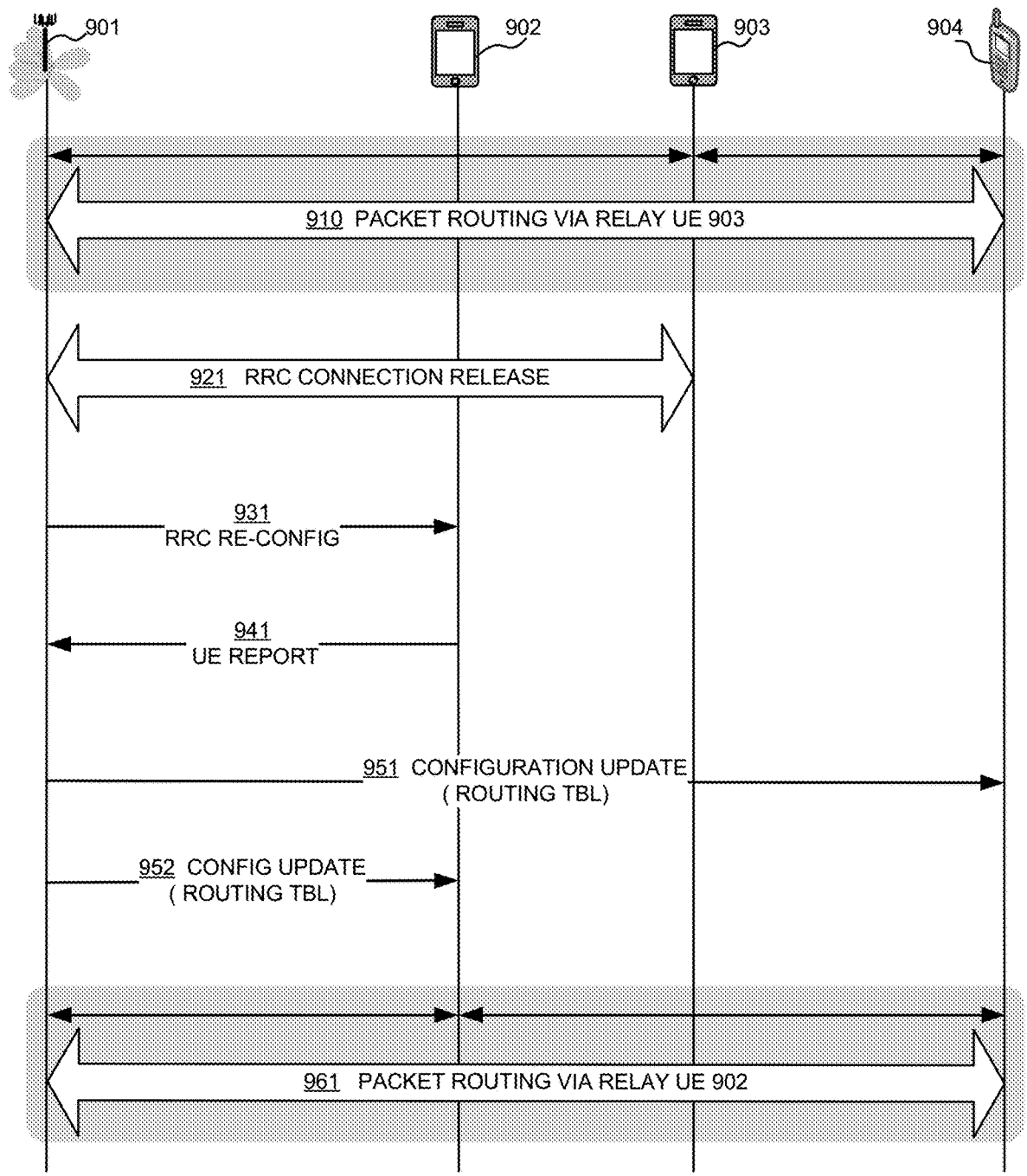
FIG. 9 illustrates exemplary flow diagrams of updating the L2-based packet routing for sidelink relay in accordance with embodiments of the current invention.

FIG. 9 illustrates exemplary flow diagrams of updating the L2-based packet routing for sidelink relay in accordance with embodiments of the current invention. At step 910, a packet routing via L2-based sidelink relay is established with a remote UE 904 by a gNB 901 through a relay UE 903. At step 921, the RRC connection between gNB 901 and relay UE 903 is released. The relay path between gNB 901 and remote UE 904 via relay UE 903 is no longer available. At step 931, gNB 901 configures another UE, relay UE 902 to perform radio signal measurement over sidelink. In one embodiment, the measurement configuration is forwarded to candidate UE 902 via Uu RRC message. In another embodiment, the measurement configuration is a forwarded RRC message over a PC5 interface, e.g. an RRC Reconfiguration with configured measurement object. In one embodiment, the measurement configuration sent to relay UE 902 is either triggered by the RRC connection release of the relay UE 903, or is triggered in a dynamic or periodic manner for an update to the relay path. In yet another embodiment, gNB 901 commands one or more candidate UEs to perform measurement. At step 941, candidate UE 902 sends gNB 901 the UE report based on the measurement configuration received from gNB 901. The UE report includes camping cell measurement report and the sidelink measurement report from candidate UEs and the remote UE 904. gNB 901 determines its update of the allocation of the ADAPT layer addresses and the routing table to each node within relay path to remote UE 904. At step 951, gNB 901 send configuration update with updated routing table to remote UE 904. At step 952, gNB 901 sends configuration update with updated routing table to relay UE 902. In one embodiment, the configuration update is sent using RRC messages. Upon receiving the updated routing parameters, the remote UE 904 and relay UE 902 update the UE context to include the new configured routing parameters. In one embodiment, the new configured routing parameter includes ADAPT layer address and the updated routing table. The ADAPT layer address is optional in the updated configuration parameter. When there is a newly joining relay UE in the relay path, ADAPT layer address is mandatory. In one embodiment, more than one new relay UEs are added to the updated relay path. In another embodiment, more than one relay UEs update their routing parameters and/or more than one relay UEs are released from the relay path. At step 961, new relay path is used for gNB 901 and remote UE 904 using relay UE 902.

Figure 10:
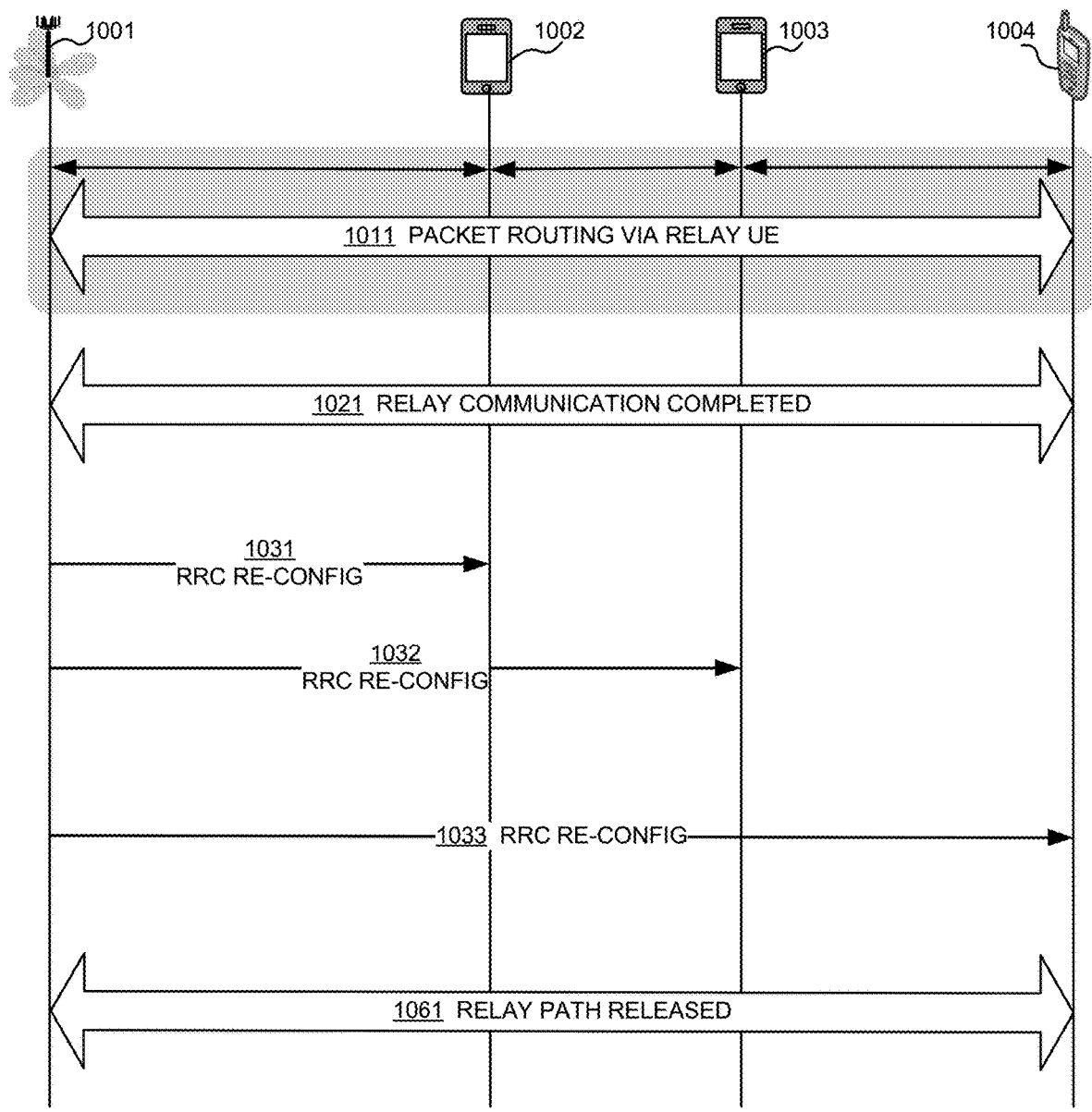
FIG. 10 illustrates exemplary flow diagrams of the release procedure for the L2-based packet routing for sidelink relay in accordance with embodiments of the current invention.

FIG. 10 illustrates exemplary flow diagrams of the release procedure for the L2-based packet routing for sidelink relay in accordance with embodiments of the current invention. At step 1011, L2-based packet routing with sidelink relay is established between gNB 1001 and remote UE 1004 through relay UE 1002 and relay UE 1003. At step 1021, the relay communication between gNB 1001 and remote UE 1004 is completed. gNB 1001, via Uu RRC message or forwarded RRC message over PC5, sends RRC Reconfiguration message to relay UE 1002 and relay UE 1003 to release packet routing to remote UE 1004 at step 1031 and step 1032, respectively. In one embodiment, the ADAPT layer address of the remote UE identifies the relay path to be released. When the relay UE receives the RRC message, the relay UE needs to remove the routing information specific to a particular remote UE within the UE context. When the relay UE serves multiple remote UE, the routing information specific to other remote UE(s) is kept in its UE context. At step 1033, gNB 1001, via Uu RRC message or forwarded RRC message over PC5, sends RRC Re-configuration message to release the packet routing configuration. Steps 1031, 1032, 1033 may be performed in other sequences. In one embodiment, the direct configuration via air interface is configured when the RRC message to release the routing information is carried by the Uu RRCReconfiguration message. In another embodiment, the indirect configuration via PC5 interface is configured when the RRC message to release the routing information is carried by RRCReconfigurationSideLink message. In yet another embodiment, the remote UE is out of coverage, the RRC message to release the routing information to the remote UE is forwarded by a relay UE. In one embodiment, when the relay UE is served by a different gNB, the RRC message to release routing information to the relay UE is forwarded by its serving gNB to the relay UE. At step 1061, the L2-based sidelink relay path is released.

Figure 11:
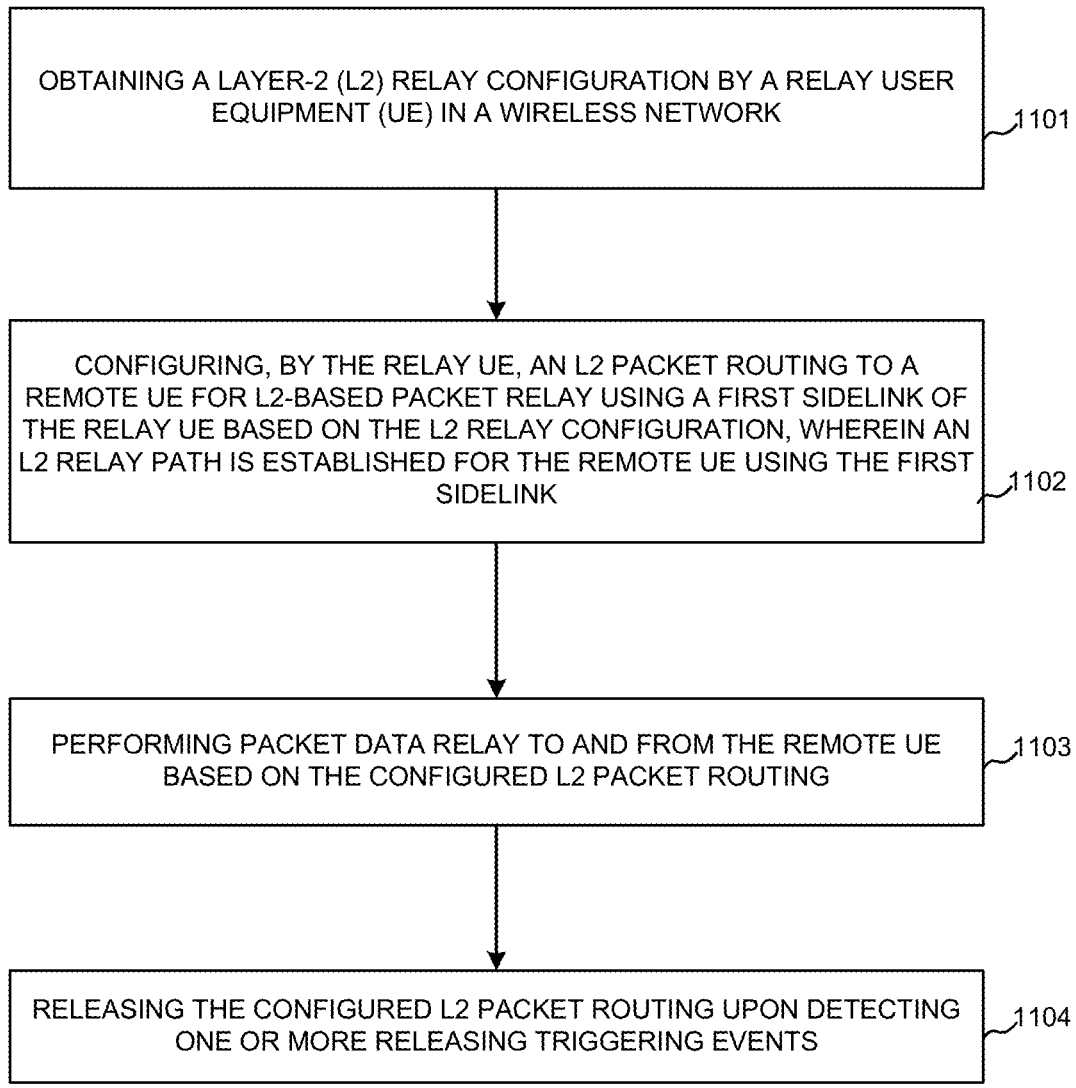
FIG. 11 is an exemplary flow chart for a relay UE in the L2-based sidelink relay communication path in accordance with embodiments of the current invention.

FIG. 11 is an exemplary flow chart for a relay UE in the L2-based sidelink relay communication path in accordance with embodiments of the current invention. At step 1101, the relay UE obtains an L2 relay configuration in a wireless network. At step 1102, the relay UE configures an L2 packet routing to a remote UE for L2-based packet relay using a first sidelink of the relay UE based on the L2 relay configuration, wherein an L2 relay path is established for the remote UE using the first sidelink. At step 1103, the relay UE performs packet data relay to and from the remote UE based on the configured L2 packet routing. At step 1104, the relay UE releases the configured L2 packet routing upon detecting one or more releasing triggering events.

Figure 12:
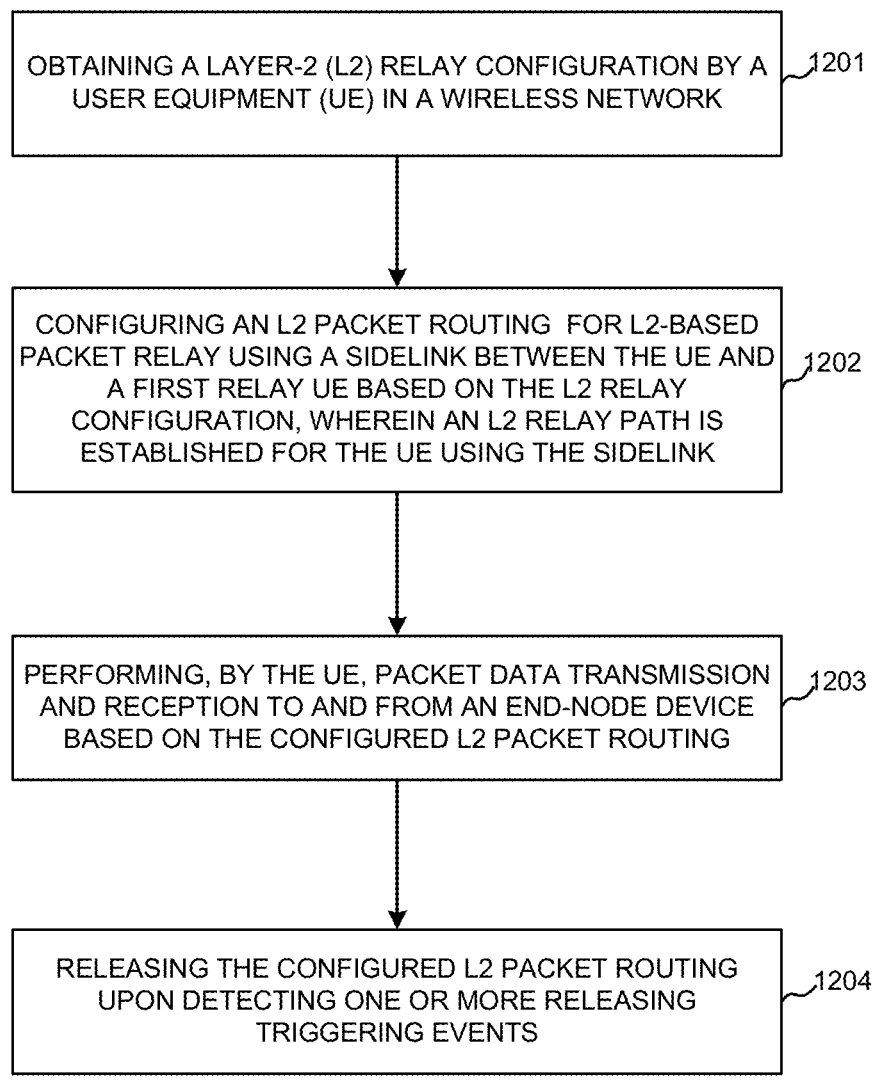
FIG. 12 is an exemplary flow chart for an end-node UE in the L2-based sidelink relay communication path in accordance with embodiments of the current invention.

FIG. 12 is an exemplary flow chart for an end-node UE in the L2-based sidelink relay communication path in accordance with embodiments of the current invention. At step 1201, the end-node UE obtains an L2 relay configuration in a wireless network. At step 1202, the end-node UE configures an L2 packet routing for L2-based packet relay using a sidelink between the end-node UE and a first relay UE based on the L2 relay configuration, wherein an L2 relay path is established for the end-node UE using the sidelink. At step 1203, the end-node UE performs packet data transmission and reception to and from an end-node based on the configured L2 packet routing. At step 1204, the end-node UE releases the configured L2 packet routing upon detecting one or more releasing triggering events.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving a layer-2 (L2) relay configuration message comprising an L2 configuration by a relay user equipment (UE) from a gNB in a wireless network, wherein the L2 relay configuration message includes at least one element of an adaptation layer address of a node in an L2 relay path, and wherein the adaptation layer is an L2 sublayer immediate above a radio link control (RLC) layer and immediate below a packet data convergence protocol (PDCP) layer for routing of L2-based sidelink relay, and wherein each adaptation layer address is allocated per a specific UE identification (ID);
configuring, by the relay UE, an L2 packet routing to a remote UE for L2-based packet relay using a first sidelink of the relay UE based on the L2 relay configuration message and a routing table that includes one or more adaptation layer addresses, wherein each of the one or more adaptation layer addresses corresponds to one of one or more UEs in the L2 relay path, and wherein the L2 relay path is established for the remote UE using the first sidelink;
performing packet data relay to and from the remote UE based on the configured L2 packet routing; and
releasing the configured L2 packet routing upon detecting one or more releasing triggering events.

2. The method of claim 1, wherein the L2 relay configuration is generated by a first base station in the wireless network, and wherein the L2 relay configuration is based on UE information reports from a plurality of UE candidates for establishing the L2 relay path.

3. The method of claim 2, wherein a UE information report of each UE candidate includes one or more elements comprising an indication of interests for a sidelink relay, one or more frequencies available for a sidelink relay, and one or more UE measurement results over one or more corresponding sidelinks to one or more peer UEs.

4. The method of claim 2, wherein the first base station receives an UE information report of a candidate UE by an Uu interface RRC message from the candidate UE, or through an Xn interface from a second base station that receives the UE information report from the candidate UE through an RRC message.

5. The method of claim 2, wherein the relay UE obtains the L2 relay configuration from an Uu interface RRC message from the first base station, or from an Uu interface RRC message from a second base station that obtains the L2 relay configuration from the first base station through an Xn interface.

6. The method of claim 1, wherein the routing table includes one or more remote UEs with corresponding one or more relay paths.

7. The method of claim 6, wherein the routing table includes one or more routing elements comprising one or more adaptation layer addresses, a relay path ID, and a next hop address.

8. The method of claim 1, wherein the relay path includes one or more relay hops.

9. The method of claim 1, further comprising:
receiving an updated L2 relay configuration, wherein the updated L2 relay configuration is triggered by one or more updated UE information reports from one or more candidate UEs; and
updating the L2 packet routing to the remote UE based on the updated L2 relay configuration.

10. A method comprising:
receiving a layer-2 (L2) relay configuration message comprising an L2 configuration by a user equipment (UE) in a wireless network, wherein the L2 relay configuration message configures a node in an L2 relay path with an adaptation layer address and with a routing table that includes a destination node adaptation layer address and a next hop adaptation layer address, and wherein the adaptation layer is an L2 sublayer immediately above a radio link control (RLC) layer and immediately below a packet data convergence protocol (PDCP) layer for routing of L2-based sidelink relay packet routing, wherein each adaptation layer address corresponds to one UE in the L2 relay path, and wherein each adaptation layer address is allocated per a specific UE identification (ID);
configuring an L2 packet routing for L2-based packet relay using a sidelink between the UE and a first relay UE based on the routing table and the adaptation layer addresses in the L2 relay configuration message, wherein the L2 relay path is established for the UE using the first sidelink;
performing, by the UE, packet data transmission and reception to and from an end-node device based on the configured L2 packet; and
releasing the configured L2 packet routing upon detecting one or more releasing triggering events.

11. The method of claim 10, wherein the end-node device is an end-node base station or an end-node UE.

12. The method of claim 10, wherein the L2 relay configuration is generated by a first base station in the wireless network, and wherein the L2 relay configuration is based on UE information reports from a plurality of UE candidates for establishing the L2 relay path.

13. The method of claim 12, wherein a UE information report of each UE candidate includes one or more elements comprising an indication of interests for a sidelink relay, one or more frequencies available for a sidelink relay, and one or more UE measurement results over one or more corresponding sidelinks to one or more peer UEs.

14. The method of claim 12, wherein the first base station receives an UE information report of a candidate UE from an Uu interface RRC message from the candidate UE, or through an Xn interface from a second base station that receives the UE information report from the candidate UE through an RRC message.

15. The method of claim 10, wherein the routing table includes one or more remote UEs with corresponding one or more relay paths.

16. The method of claim 10, wherein the relay path includes one or more relay hops.

17. The method of claim 10, further comprising:
receiving an updated L2 relay configuration, wherein the updated L2 relay configuration is triggered by one or more updated UE information reports from one or more candidate UEs; and
updating the L2 packet routing to the end-node device based on the updated L2 relay configuration.

18. A user equipment (UE), comprising:
a transceiver that transmits and receives radio frequency (RF) signal in a wireless network;
a layer-2 (L2) sidelink relay circuit that receives an L2 relay configuration message comprising an L2 configuration, wherein the L2 relay configuration message configures a node in an L2 relay path with an adaptation layer address and with a routing table that includes a destination node adaptation layer address and a next hop adaptation layer address, wherein an adaptation layer is an L2 sublayer immediately above a radio link control (RLC) layer and immediately below a packet data convergence protocol (PDCP) layer for routing of L2-based sidelink relay packet routing, wherein each adaptation layer address corresponds to one UE in the L2 relay path and wherein each adaptation layer address is allocated per a specific UE identification (ID);
an L2 packet routing circuit that configures an L2 packet routing to a remote UE for L2-based packet relay using a first sidelink of the UE based on the routing table and the adaptation layer address in the L2 relay configuration message, wherein the L2 relay path is established for the remote UE using the first sidelink;
an I2 packet relay circuit that performs packet data relay to and from the remote UE based on the configured L2 packet routing; and
a relay release circuit that releases the configured L2 packet routing upon detecting one or more releasing triggering events.

19. The UE of claim 18, wherein the L2 relay configuration is generated by a first base station in the wireless network, and wherein the L2 relay configuration is based on UE information reports from a plurality of UE candidates for establishing the L2 relay path.

20. The UE of claim 18, wherein the routing table includes one or more remote UEs with corresponding one or more relay paths.

\* \* \* \* \*